(12) United States Patent
Wang et al.

(10) Patent No.: US 11,281,943 B2
(45) Date of Patent: Mar. 22, 2022

(54) METHOD FOR GENERATING TRAINING DATA, IMAGE SEMANTIC SEGMENTATION METHOD AND ELECTRONIC DEVICE

(71) Applicant: CLOUDMINDS (SHENZHEN) ROBOTICS SYSTEMS CO., LTD., Shenzhen (CN)

(72) Inventors: Kai Wang, Shenzhen (CN); Shiguo Lian, Shenzhen (CN); Luowei Wang, Shenzhen (CN)

(73) Assignee: CLOUDMINDS ROBOTICS CO., LTD., Shanghai (CN)

( * ) Notice: Subject to any disclaimer, the term of this patent is extended or adjusted under 35 U.S.C. 154(b) by 133 days.

(21) Appl. No.: 16/750,355

(22) Filed: Jan. 23, 2020

(65) Prior Publication Data

US 2020/0160114 A1 May 21, 2020

Related U.S. Application Data

(63) Continuation of application No. PCT/CN2017/094312, filed on Jul. 25, 2017.

(51) Int. Cl.
*G06K 9/62* (2022.01)
*G06K 9/38* (2006.01)
*G06N 3/08* (2006.01)
*G06T 19/00* (2011.01)

(52) U.S. Cl.
CPC ............. *G06K 9/6257* (2013.01); *G06K 9/38* (2013.01); *G06N 3/08* (2013.01); *G06T 19/003* (2013.01)

(58) Field of Classification Search
CPC .......... G06K 9/6257; G06K 9/38; G06N 3/08; G06T 19/003
See application file for complete search history.

(56) References Cited

U.S. PATENT DOCUMENTS

| 10,217,195 B1* | 2/2019 | Agrawal | G06T 7/11 |
| 2012/0041722 A1* | 2/2012 | Quan | G06T 17/05 |
| | | | 703/1 |

(Continued)

FOREIGN PATENT DOCUMENTS

| CN | 103268635 A | 8/2013 |
| CN | 106169082 A | 11/2016 |

(Continued)

OTHER PUBLICATIONS

Supplementary European Search Report and European search opinion dated Jan. 28, 2021; EP 17919247.1.

(Continued)

*Primary Examiner* — Qun Shen

(57) ABSTRACT

A method for generating training data includes: defining a corresponding category tag for an object model in a three-dimensional scenario; acquiring a plurality of corresponding scenario images by modifying scenario parameters of the three-dimensional scenario; rendering the object model to a monochromic material corresponding to the category tag of the object model; acquiring a semantic segmentation image corresponding to each scenario image based on the rendered object model; and storing each scenario image and the semantic segmentation image corresponding to the scenario image as a set of training data.

15 Claims, 6 Drawing Sheets

(56) References Cited

U.S. PATENT DOCUMENTS

| | | | | |
|---|---|---|---|---|
| 2012/0327172 | A1* | 12/2012 | El-Saban | G06K 9/00664 348/14.02 |
| 2013/0084007 | A1* | 4/2013 | Salamati | G06T 7/143 382/173 |
| 2013/0286334 | A1* | 10/2013 | Satoh | G02F 1/167 349/106 |
| 2014/0049535 | A1* | 2/2014 | Wang | G01B 11/2509 345/419 |
| 2014/0328570 | A1* | 11/2014 | Cheng | H04N 21/44008 386/241 |
| 2017/0193340 | A1 | 7/2017 | Shtok et al. | |
| 2017/0304732 | A1* | 10/2017 | Velic | G06N 3/08 |
| 2018/0108138 | A1* | 4/2018 | Kluckner | G06K 9/3233 |

FOREIGN PATENT DOCUMENTS

| | | |
|---|---|---|
| EP | 3156942 A1 | 4/2017 |
| JP | 2011065382 A | 3/2011 |
| JP | 2013097473 A | 5/2013 |
| JP | 2016006616 A | 1/2016 |
| JP | 2017037424 A | 2/2017 |

OTHER PUBLICATIONS

John Mccormac et al: "SceneNet RGB-D: 5M Photorealistic Images of Synthetic Indoor Trajectories with Ground Truth", Dec. 15, 2016(Dec. 15, 2016), 11 pages.

Yinda Zhang et al: "Physically-Based Rendering for Indoor Scene Understanding Using Convolutional Neural Networks", arxiv.org, Cornell University Library, 201 Olin Library Cornell University Ithaca, NY 14853, Dec. 22, 2016(Dec. 22, 2016), 17 pages.

Richter Stephan R et al: "Playing for Data: Ground Truth from Computer Games", Sep. 17, 2016 (Sep. 17, 2016), 12th European Conference On Computer Vision, ECCV 2012; [Lecture Notes in Computer Science], Springer Berlin Heidelberg, Berlin Germany, pp. 102-118.

International Search Report dated Apr. 24, 2018; PCT/CN2017/094312.

1st Office Action dated Mar. 9, 2021 by the JP Office; Appln.No. 2020-524660.

* cited by examiner

METHOD FOR GENERATING TRAINING DATA, IMAGE SEMANTIC SEGMENTATION METHOD AND ELECTRONIC DEVICE

CROSS-REFERENCE TO RELATED APPLICATIONS

This application is a continuation of International Application No. PCT/CN2017/094312 with an international filing date of Jul. 25, 2017, the entire contents of which are incorporated herein by reference.

TECHNICAL FIELD

The present application relates to the technical field of image processing, and in particular, relates to a method for generating training data, an image semantic segmentation method and an electronic device.

BACKGROUND

With respect to machine learning (especially, deep learning), operation of the algorithm needs to be based on a large amount of sample data. Accuracy and abundance of the sample data are very significant for the machine learning.

For example, in real scenario semantic segmentation practiced based on the deep learning, a neural network model needs to be trained by using a large quantity of training data sets. In this way, the trained neural network model may achieve a better semantic segmentation result.

The training data set includes indoor and outdoor scenario images, and pictures obtained upon accurate semantic segmentation. For an assured training effect of the models, in one aspect, the indoor and outdoor scenario images shall include as many as possible scenarios and pictures of each scenario in different time points, illumination conditions, weather conditions or the like. In another aspect, it is required that the corresponding semantic segmentation image be accurately segmented according to the object category.

Before the semantic segmentation images corresponding to the indoor and outdoor scenario images are generated, the objects in the scenario images need to be firstly accurately segmented according to the object category. Afterwards, the region of each category of objects is annotated in the pictures to form the corresponding semantic segmentation image.

During studies of the related art, the applicants have identified that:

In the conventional training data set, the scenario images are manually acquired and the semantic segmentation images are annotated manually, such that a large amount of time and manpower is consumed. In addition, with respect to a specific indoor and outdoor scenario, the number of scenario images that may be used is limited. The segmentation precision of the semantic segmentation images is also hard to be ensured.

SUMMARY

An embodiment of the present application provides a method for generating training data. The method includes: defining a corresponding category tag for an object model in a three-dimensional scenario; acquiring a plurality of corresponding scenario images by modifying scenario parameters of the three-dimensional scenario; rendering the object model to a monochromic material corresponding to the category tag of the object model; acquiring a semantic segmentation image corresponding to each scenario image based on the rendered object model; and storing each scenario image and the semantic segmentation image corresponding to the scenario image as a set of training data.

Another embodiment of the present application provides an image semantic segmentation method. The scenario image generated by the method for generating the training data as defined above and the corresponding semantic segmentation image are used as training data.

Still another embodiment of the present application provides an electronic device. The electronic device includes at least one processor; and a memory communicably connected to the at least one processor; wherein the memory stores an instruction program executable by the at least one processor, wherein, the instruction program, when being executed by the at least one processor, cause the at least one processor to perform the abovementioned method.

BRIEF DESCRIPTION OF THE DRAWINGS

One or more embodiments are illustrated by way of example, and not by limitation, in the figures of the accompanying drawings, wherein components having the same reference numeral designations represent like components throughout. The drawings are not to scale, unless otherwise disclosed.

DETAILED DESCRIPTION

For clearer descriptions of the objectives, technical solutions, and advantages of the present application, the present application is further described with reference to specific embodiments and attached drawings. It should be understood that the specific embodiments described herein are only intended to explain the present application instead of limiting the present application.

Figure 1:
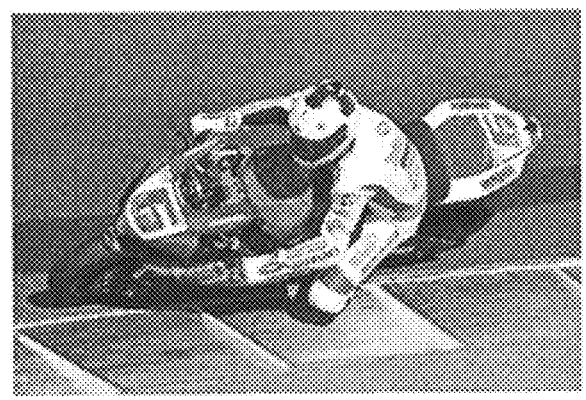
FIG. 1 is a schematic diagram of an image semantic segmentation result according to an embodiment of the present application.
Figure 1:
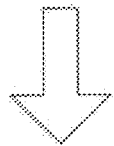
Figure 1:
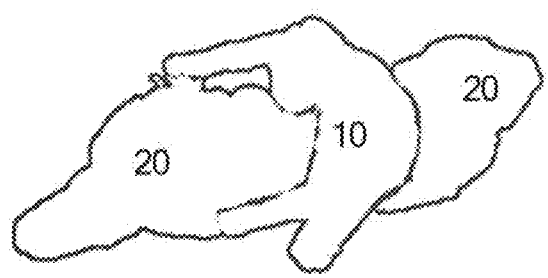

Image semantic segmentation is a fundamental technology in image understanding, and is significantly important in automatic driving systems, unmanned aerial vehicle applications, or various types of smart wearable devices. The image semantic segmentation practically groups or segments pixels in an image according to meanings thereof in the image, and annotates the pixels. For example, as illustrated in FIG. 1, upon the image semantic segmentation, a semantic region 10 annotated as "person", and a semantic region 20 annotated as "motorcycle" are formed.

In a real image, the same object denoting the same semantics is generally formed by different parts, and each part has a different color, texture or luminance. Therefore, in case of a complex scenario, the traditional semantic segmentation method based on low-order visual information of pixel points has a poor effect.

To accommodate complex scenarios or tasks, the image semantic segmentation may be carried out by using deep learning as a framework. Although compared with the traditional segmentation method, the image semantic segmentation technology based on the deep learning achieves a remarkable segmentation effect, the deep learning requires an algorithm training and learning process.

In the algorithm training and learning process of the deep learning, a stricter requirement is imposed on training data, and a trained semantic segmentation algorithm achieves an extremely high semantic segmentation precision only with masses of image data and highly accurate image data annotation information (even annotation information reaching a pixel level) are desired.

With rapid developments of the computer graphics rendering technology, the rendering effect of a conventional virtual 3D scenario is more and more approaching reality, and fixed-frame pictures originated from the virtual 3D scenario are also becoming more and more real and finer. Accordingly, desired training data may be conveniently generated based on the virtual 3D scenario, cost in acquiring high-precision training data is effectively lowered, and training data is quickly and effectively acquired.

Figure 2:
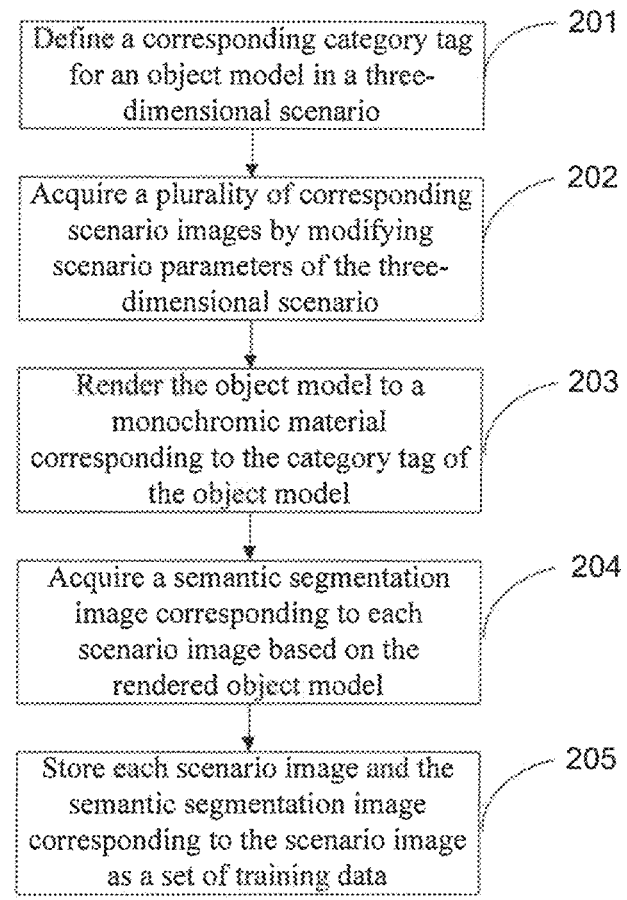
FIG. 2 is a flowchart of a method for generating training data according to an embodiment of the present invention.

FIG. 2 is a flowchart of generating training data based on a conventional virtual 3D scenario according to an embodiment of the present application.

As illustrated in FIG. 2, the method includes the following steps:

201: A corresponding category tag is defined for an object model in a three-dimensional scenario.

The three-dimensional scenario refers to a three-dimensional scenario constructed by any suitable 3D modeling software. The three-dimensional scenario is formed by a plurality of object models, for example, a living room formed by a table, a ceiling, a wall surface and a lamp.

Each category tag represents the category of an object model, which may be specifically set according to the actual three-dimensional scenario. For example, such categorization tags as decoration, furniture and wall surface may be set to the object models in the three-dimensional scenario according to indexes of the object models.

It may be understood that the step of setting the categorization tag is a process of annotating the content or meaning of the object model. In the 3D modeling, a constructing unit or construction basis in the three-dimensional scenario is the object model. Therefore, this annotation process is highly precise and is simply implemented.

202: A plurality of corresponding scenario images are acquired by modifying scenario parameters of the three-dimensional scenario.

The scenario parameters are some factors affecting the appearance performance of the three-dimensional model, for example, illumination, observation perspective or observation angle. That is, the scenario images are planar images of the three-dimensional scenario that are acquired under the effect of different factors. For example, the planar images of the three-dimensional scenario under different observation perspectives, view angles or different conditions are acquired, for example, a plane view, a side view or an oblique view of the three-dimensional scenario. With respect to the same three-dimensional scenario, a plurality of different scenario images may be acquired. These scenario images reflect the three-dimensional scenario from different angles or sides, and exhibit display of the three-dimensional scenario in different environments.

The specific way of acquiring the scenario images is determined according to the 3D modeling software used for the three-dimensional scenario. Generally, the 3D modeling software may provide a virtual camera to acquire the scenario images.

203: The object model is rendered to a monochromic material corresponding to the category tag of the object model. In this embodiment, the monochromic material refers to a material having a single color, and the term "rendering" is herein construed as filling the object model with a corresponding color, for example, rendering the table to be purely blue, rendering the lamp to be yellow or the like.

According to the category tag, the object model is rendered to different monochromic materials, such that the object model is reflected in a corresponding color in the three-dimensional model. Different colors denote different groups or different semantic regions (that is, an image semantic segmentation result as illustrated in FIG. 1 is formed). The monochromic material may be specifically any suitable single color or pattern structure, for example, single blue, red or yellow. The monochromic material refers to a surface color or pattern of the object model. Nevertheless, after being rendered to the monochromic material, the object model still maintains the original appearance and profile.

Specifically, during the rendering process, shielding between the object models in the scenario needs to be considered to ensure that the finally acquired semantic segmentation image complies with normal visual preferences. Therefore, a depth sequence of the object model in the scenario image needs to be firstly determined. Afterwards, the object model is rendered in sequence to the monochromic material corresponding to the category tag of the object model.

In this way, a correct shielding sequence may be maintained between the object models, and the case where the rear object model shields the front object model such that the training data encounters errors may be prevented.

204: A semantic segmentation image corresponding to each scenario image is acquired based on the rendered object model.

As described above, during the training process of the image semantic segmentation algorithm, in addition to the scenario images, pictures with various parts in the scenario image accurately annotated are also needed. Herein, the term "semantic segmentation image" is constructed as a picture with the pixel points in the scenario image accurately annotated. The above rendering process is carried out in the 3D modeling software. Therefore, theoretically, the annotation precision of the finally acquired semantic segmentation image may reach the pixel level.

205: Each scenario image and the semantic segmentation image corresponding to the scenario image are stored as a set of training data.

With respect to the training of the image semantic segmentation algorithm, input data (that is, the scenario images) and the corresponding semantic segmentation output results (that is, the semantic segmentation images) need to be provided. Accordingly, in this embodiment, the scenario image and the corresponding semantic segmentation image may be used as a set of training data and provided for the deep learning algorithm for training.

By the method for generating the training data, a large number of training data picture set may be generated quickly and effectively. These training data pictures have an extremely high annotation precision.

It should be noted that, based on the three-dimensional scenario, a plurality of sets of training data may be quickly generated according to the actual needs. With respect to each set of training data, a semantic segmentation image may correspond to a plurality of different scenario images. For example, the scenario images under different illumination conditions correspond to the same semantic segmentation image.

Figure 3:
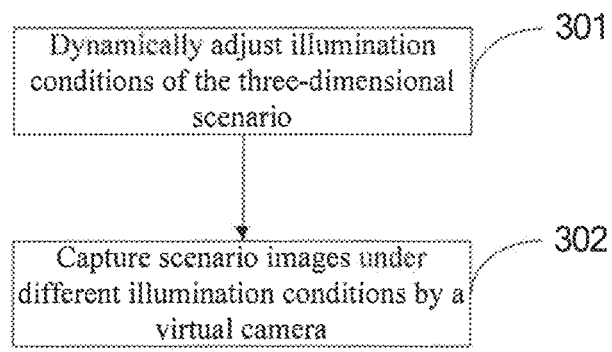
FIG. 3 is a flowchart of a method for acquiring a scenario image according to an embodiment of the present application.

In some embodiments, as illustrated in FIG. 3, the scenario images under different illumination conditions may be specifically acquired by the following steps:

301: Illumination conditions of the three-dimensional scenario is dynamically adjusted.

In the 3D modeling software, illumination is adjusted for the three-dimensional scenario, and it is a very common function to enable the three-dimensional scenario to have a corresponding shadow or luminance.

By adjusting global illumination of the three-dimensional scenario, actual scenarios of the three-dimensional model at different actual conditions such as different time points or weather conditions may be simulated. Nevertheless, in some possible cases, partial illumination of the three-dimensional model may also be adjusted to simulate a particular illumination effect, for example, a scenario image when the ceiling lamp is turned on in a three-dimensional scenario corresponding to the living room.

302: Scenario images under different illumination conditions are captured by a virtual camera.

The virtual camera refers to a functional module in the 3D modeling software which is configured to capture planar images in a three-dimensional model. The virtual camera may capture images for the three-dimensional model at different angles, focal distances or view angles in a photographing mode.

With variations of the illumination conditions of the three-dimensional scenario, the three-dimensional scenario may be photographed by the virtual machine from a plurality of different angles to acquire scenario images including different cases. Apparently, the larger the number of scenario images and included cases, the higher the data quality of the training data, and the better the training effect of the deep learning algorithm.

In this embodiment, in addition to modification of illumination, a plurality of different scenario images may be acquired in combination with variations of surface texture of the object model or variations of the moving path and angle of the virtual camera.

Specifically, by setting the photographing trajectory of the virtual camera in the 3D modeling software, several image scenarios reflect variations of the moving path and angle. Scenario images acquired from different view angles when the virtual camera moves along the photographing trajectory.

Different from the disclosure in the above method embodiment that as many as scenario images under different illumination conditions and different texture variations are acquired, in a set of training data, only one explicit semantic segmentation image is needed. That is, an ideal result upon the image semantic segmentation shall be uniquely determined. Therefore, in some embodiments, the method for acquiring the semantic segmentation images shall include the following step:

acquiring the semantic segmentation image corresponding to each scenario image based on the rendered object model when illumination of the three-dimensional scenario is turned off.

For uniqueness of the semantic segmentation image, illumination of the three-dimensional scenario needs to be turned off in the 3D modeling software, to prevent the case where different textures or luminances are caused due to impacts caused to the surface of the object model and the accuracy of the semantic segmentation image is reduced.

Where illumination of the three-dimensional scenario is turned off, the semantic segmentation image corresponding to the scenario image is acquired at the same angle and position. The corresponding semantic segmentation image specifically refers to semantic segmentation image and scenario image of the three-dimensional scenario acquired by the virtual camera at the same angle and position. The semantic segmentation image is acquired after the monochromic rendering is carried out for the object model and illumination is turned off.

In some cases, the three-dimensional model may include a transparent object model, for example, a glass window or glass door. Correspondingly, during the rendering process, the transparent object model needs to be processed differently according to the actual needs, to provide a precise and accurate semantic segmentation image.

Figure 4:
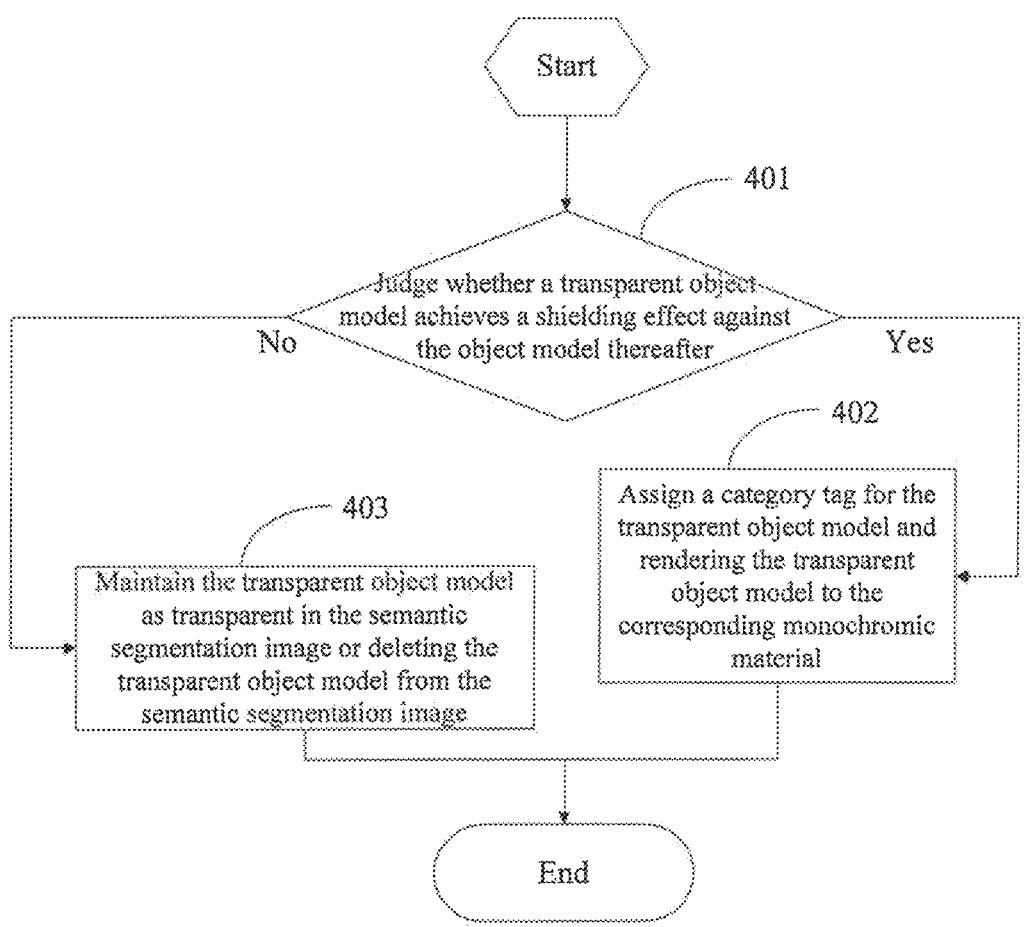
FIG. 4 is a flowchart of a method for acquiring a semantic segmentation image according to an embodiment of the present application.

As illustrated in FIG. 4, during rendering the transparent model to the monochromic material, the method includes the following steps:

401: Whether a transparent object achieves a shielding effect against the object model thereafter is judged. If the transparent object achieves the shielding effect, step 402 is performed; and otherwise, step 403 is performed.

402: When the transparent material model achieves the shielding effect, a category tag is assigned for the transparent object model and the transparent object model is rendered to the corresponding monochromic material.

When the shielding effect is achieved, it indicates that in a normal visual state, a rear object model may be shielded by the transparent object model. Therefore, corresponding monochromic rendering needs to be carried out to form a semantic segmentation image having a corresponding profile.

403: When the transparent object model fails to achieve the shielding effect, the transparent object model is maintained as transparent in the semantic segmentation image or the transparent object model is deleted from the semantic segmentation image.

If the transparent object does not achieve the shielding effect, it indicates that the transparent object may not be annotated as a region having a meaning in the semantic segmentation image. Therefore, the transparent object model may be directly deleted from the semantic segmentation image or the transparent object model is made to remain in a transparent state to prevent adverse impacts to a perspective relationship of the rear object model.

The method for generating the training data according to the embodiment of the present application may be performed in any conventional suitable 3D model software, for example, Unity30 engine, 3DMax, OpenGl, DirectX or Unreal or the like. After a sufficient amount of training data is acquired according to the three-dimensional scenario, an embodiment of the present application further provides an image semantic segmentation method. In the image semantic segmentation method, a deep learning model is trained based on the training data acquired by the method for generating the training data disclosed in the above method embodiment. This effectively addresses the problem that the cost in acquiring sample data in the conventional image semantic segmentation method is high.

Figure 5:
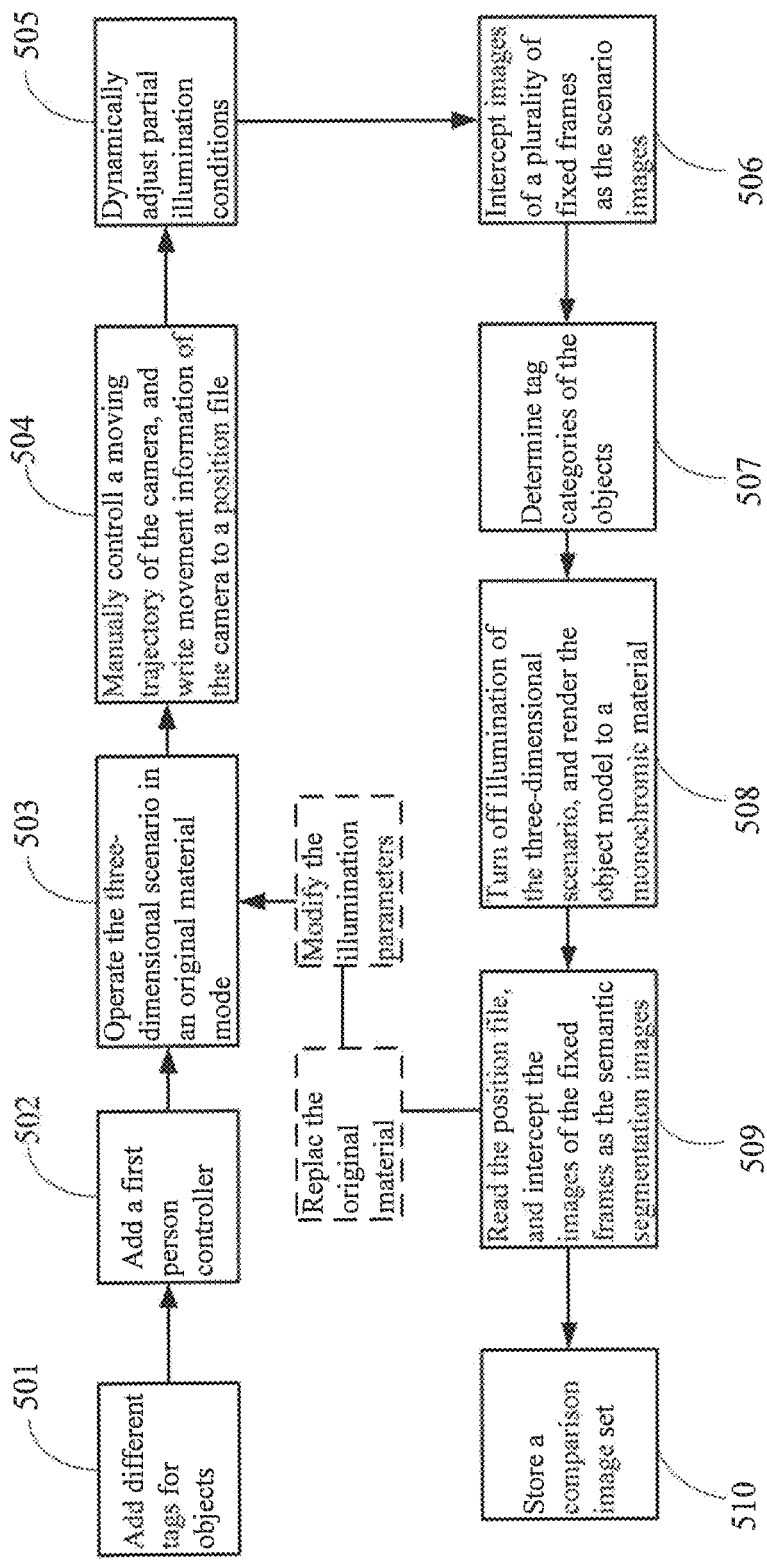
FIG. 5 is a schematic flowchart of a process of performing the method for generating the training data in a Unity 3D engine according to an embodiment of the present application.

FIG. 5 is a schematic flowchart of a process of performing the method for generating the training data in a Unity 3D engine according to an embodiment of the present application. As illustrated in FIG. 5, the process includes the following steps:

501: In an original three-dimensional scenario, objects in the three-dimensional scenario are categorized by adding different tags thereto. After the tags are added, all the objects in each tag may be acquired in the script.

502: A first person controller is added to the three-dimensional scenario.

503: The three-dimensional scenario is operated in an original material mode.

504: A moving trajectory of the camera is manually controlled, and movement information (including position coordinates and rotation angles) of the camera is written to a position file.

505: Partial illumination of the three-dimensional scenario is dynamically adjusted.

506: Images of a plurality of fixed frames are intercepted as the scenario images.

507: Tag categories of the objects are determined according to the tags set in step 501.

508: Illumination of the three-dimensional scenario is turned off, and the object model is rendered to a monochromic material.

509: The position file in step 504 is read, and the images of the fixed frames operating in the monochromic material mode are intercepted as the semantic segmentation images. By this way, it may be ensured that the images intercepted at the same time during two operating processes are totally the same, and that the semantic segmentation image corresponds to the scenario image. In addition, in such operations, control of the movement of the camera is more convenient over setting the path of the camera.

510: The semantic segmentation image and the corresponding scenario image are stored as a comparison image set. The comparison image set, as the training data, is used for raining process of the deep learning algorithm for the semantic segmentation.

Nevertheless, for acquisition of more sets of training data, upon step 509, the three-dimensional scenario may also be adjusted, including re-acquiring the scenario image and the semantic segmentation image upon modifying the illumination parameters and replacing the original material.

Figure 6:
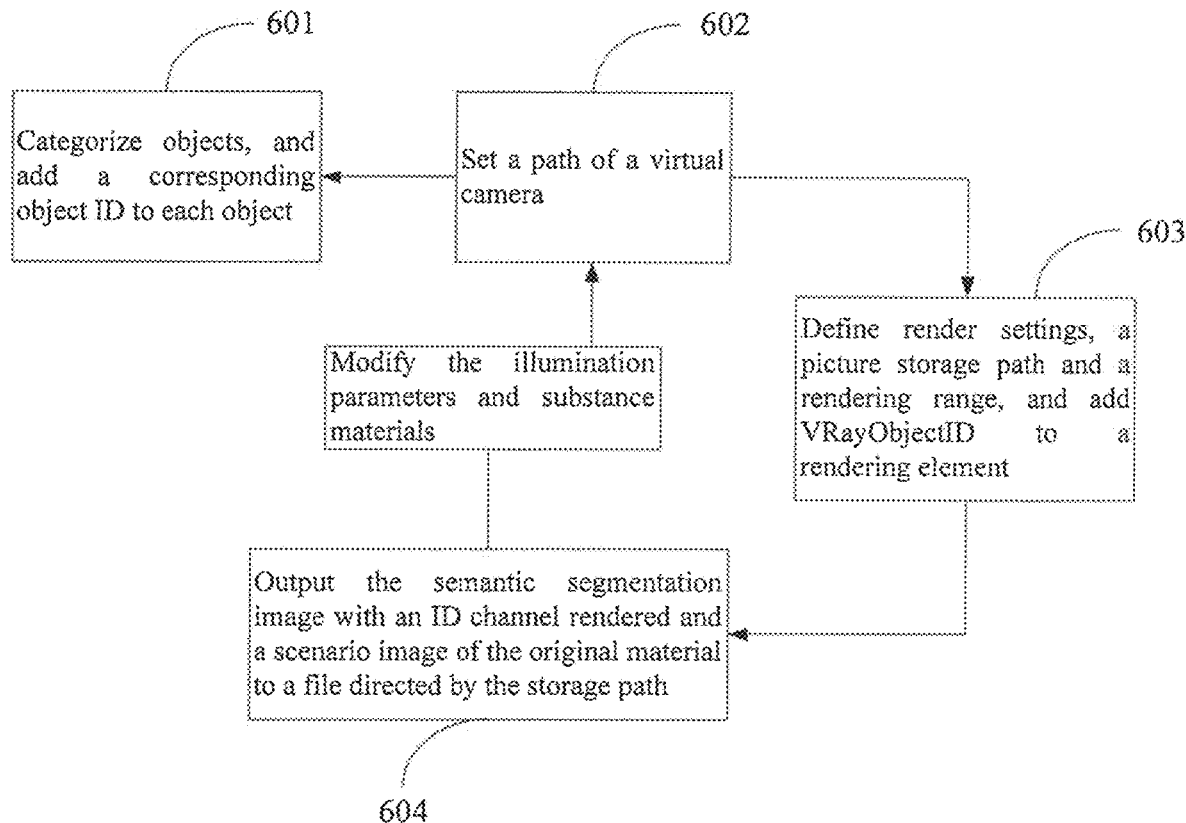
FIG. 6 is a schematic flowchart of a process of performing the method for generating the training data in a 3D Max according to an embodiment of the present application.

FIG. 6 is a schematic flowchart of a process of performing the method for generating the training data in a 3D Max according to an embodiment of the present application. As illustrated in FIG. 6, the process includes the following steps:

601: In an original three-dimensional scenario, objects are categorized, and a corresponding object ID is added to each object.

602: A path of a virtual camera is set.

603: Rendering settings, a picture storage path, a rendering range are defined, and VRayObjectID is added to a rendering element.

604: Rendering is carried out, and the semantic segmentation image with an ID channel rendered and a scenario image of the original material are output to a file directed by the storage path set in step 603.

3D Max may simultaneously store the original material and the image under illumination and the image with the ID channel rendered. Therefore, in step 604, the semantic segmentation image and the scenario image that correspond to each other are output. These output results are stored as a comparison image set, and as the training data, used in the training process of the deep learning algorithm for the semantic segmentation.

In this embodiment, for acquisition of more scenario images, upon step 604, the illumination parameters and substance materials of the three-dimensional scenario are modified.

Figure 7:
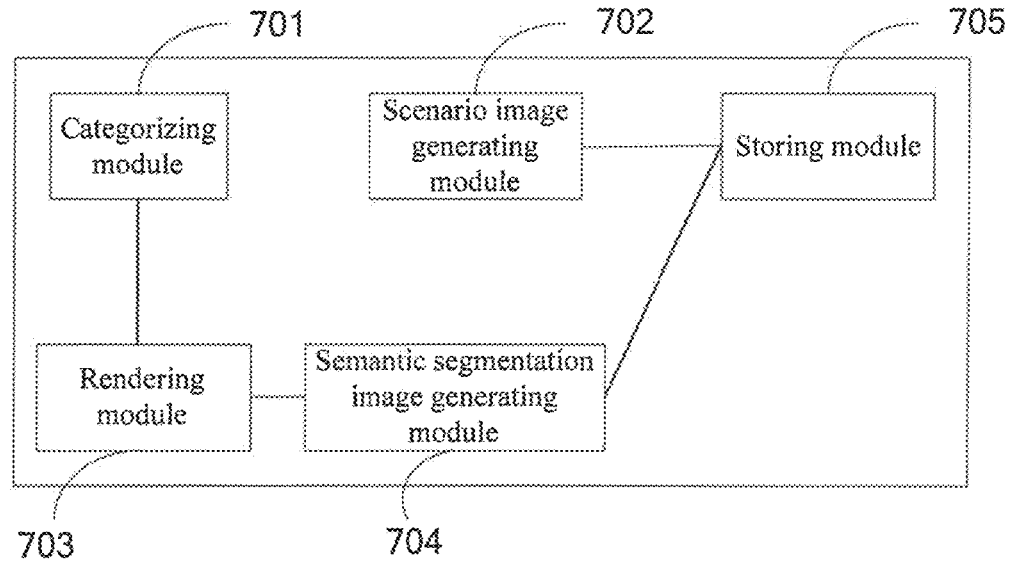
FIG. 7 is a functional block diagram of an apparatus for generating training data according to an embodiment of the present application.

An embodiment of the present application further provides an apparatus for generating training data corresponding to the above method embodiment. As illustrated in FIG. 7, the apparatus for generating the training data may include: a categorizing module 701, a scenario image generating module 702, a rendering module 703, a semantic segmentation image generating module 704 and a storing module 705.

The categorizing module 701 is configured to define a corresponding category tag for an object model in a three-dimensional scenario. The scenario image generating module 702 is configured to acquire a plurality of corresponding scenario images by modifying scenario parameters of the three-dimensional scenario. The rendering module 703 is configured to render the object model to a monochromic material corresponding to the category tag of the object model. The semantic segmentation image generating module 704 is configured to acquire a semantic segmentation image corresponding to each scenario image based on the rendered object model. The storing module 705 is configured to store each scenario image and the semantic segmentation image corresponding to the scenario image as a set of training data.

With the apparatus for generating the training data, masses of scenario images and semantic segmentation images with precise annotations corresponding to these scenario images may be quickly generated based on the three-dimensional scenario. In this way, the cost in generating the training data is effectively lowered, the time and manpower are reduced, and the segmentation precision of subsequent image semantic segmentation by the deep learning algorithm is ensured.

Figure 8:
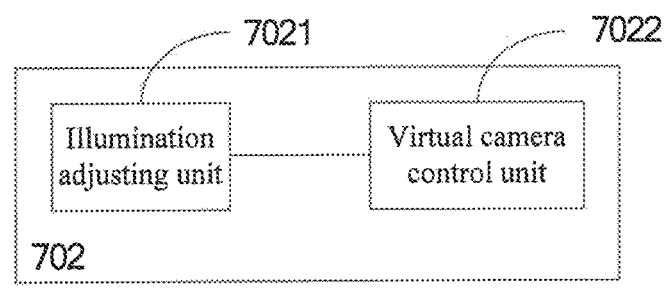
FIG. 8 is a functional block diagram of a scenario image generating module according to an embodiment of the present application.

In some embodiments, the images may be captured by the virtual camera or a similar functional module of the 3D modeling software. As illustrated in FIG. 8, the scenario image generating module 702 specifically includes an illumination adjusting unit 7021 and a virtual camera control unit 7022.

The illumination adjusting unit 7021 is configured to dynamically adjust illumination in the three-dimensional scenario. The virtual camera control unit 7022 is configured to capture scenario images under different illumination conditions by a virtual camera.

Specifically, the virtual camera control unit 7022 is specifically configured to set a photographing trajectory of the virtual camera, and capture scenario images from different observation angles when the virtual machine moves along the photographing trajectory.

In some other embodiments, the rendering module 703 may be specifically configured to acquire the semantic segmentation image corresponding to each scenario image when illumination of the three-dimensional scenario is turned off.

Specifically, to ensure that the semantic segmentation image has a correct profile and a shielding sequence, the rendering module 703 is specifically configured to: determine a depth sequence of the object model in the scenario images; and render in sequence the object model to the monochromic material corresponding to the category tag of the object model.

In some particular cases, a transparent object model may be present in the three-dimensional scenario. With respect to the transparent object model, the rendering unit may be specifically configured to: judge whether a transparent object achieves a shielding effect against the object model thereafter; when the transparent material model achieves the shielding effect, assign a category tag for the transparent object model and rendering the transparent object model to the corresponding monochromic material; and when the transparent object model fails to achieve the shielding effect, maintain the transparent object model as transparent in the semantic segmentation image or delete the transparent object model from the semantic segmentation image.

It should be noted that the method for generating the training data according to the above embodiment and the apparatus for generating the training data are based on the same inventive concept. Therefore, the steps of the specific embodiments of the method for generating the training data may be performed by the corresponding functional modules. The specific functions of the functional modules may correspond to the method steps in the method for generating the training data, which are not described herein any further.

Figure 9:
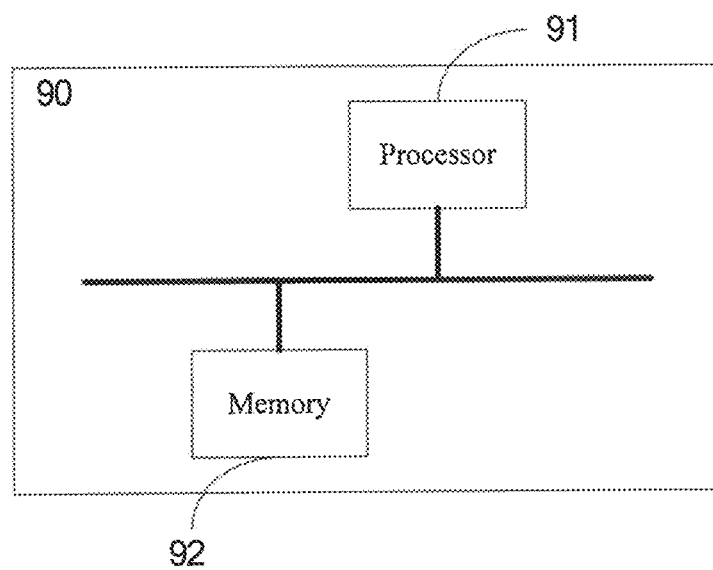
FIG. 9 is a schematic structural diagram of an electronic device according to an embodiment of the present application.

FIG. 9 is a schematic structural diagram of hardware of an electronic device according to an embodiment of the present application. As illustrated in FIG. 9, the device includes at least one processor 91 and a memory 92, and FIG. 9 uses one processor 91 as an example.

The at least one processor 91 and the memory 92 may be connected via a bus or in another fashion, and FIG. 9 uses the bus as an example.

The memory 92, as a non-volatile computer readable storage medium, may be configured to store non-volatile software programs, non-volatile computer executable programs and modules, for example, the program instructions/modules corresponding to the method for generating the training data in the embodiments of the present application (for example, the categorizing module 701, the scenario image generating module 702, the rendering module 703, the semantic segmentation image generating module 704 and the storing module 705 as illustrated in FIG. 7). The non-volatile software programs, instructions and modules stored in the memory 91, when being executed, cause the processor 92 to perform various function applications and data processing of the apparatus for generating the training data, that is, performing the method for generating the training data in the above method embodiments.

The memory 92 may include a program memory area and data memory area, wherein the program memory area may store operation systems and application programs needed by at least function; and the data memory area may store data created according to the usage of the apparatus for generating the training data. In addition, the memory 92 may include a high speed random access memory, or include a non-volatile memory, for example, at least one disk storage device, a flash memory device, or another non-volatile solid storage device. In some embodiments, the memory 92 optionally includes memories remotely configured relative to the processor 91. These memories may be connected to the apparatus for generating the training data over a network. Examples of the above network include, but not limited to, the Internet, Intranet, local area network, mobile communication network and a combination thereof.

The one or more modules are stored in the memory 92, and when being executed by the at least one processor 91, the one or more modules perform the method for generating the training data in any of the above method embodiments.

The product may perform the method according to the embodiments of the present application, has corresponding function modules for performing the method, and achieves the corresponding beneficial effects. For technical details that are not illustrated in detail in this embodiment, reference may be made to the description of the methods according to the embodiments of the present application.

An embodiment of the present application provides a computer program product. The computer program product includes a computer program stored on a non-volatile computer-readable storage medium. The computer program includes program instructions. The program instructions, when being executed by a computer, may cause the computer to perform the method for generating the training data in any of the above method embodiments, for example, performing steps 201 to 204 in the method as illustrated in FIG. 2, and implementing the functions of the functional modules as illustrated in FIG. 7.

The above described apparatus embodiments are merely for illustration purpose only. The units which are described as separate components may be physically separated or may be not physically separated, and the components which are illustrated as units may be or may not be physical units, that is, the components may be located in the same position or may be distributed into a plurality of network units. A part or all of the modules may be selected according to the actual needs to achieve the objectives of the technical solutions of the embodiments.

According to the above embodiments of the present application, a person skilled in the art may clearly understand that the embodiments of the present application may be implemented by means of hardware or by means of software plus a necessary general hardware platform. Persons of ordinary skill in the art may understand that all or part of the steps of the methods in the embodiments may be implemented by a program instructing relevant hardware. The program may be stored in a computer-readable storage medium and may be executed by at least one processor. When the program runs, the steps of the methods in the embodiments are performed. The storage medium may be any medium capable of storing program codes, such as read-only memory (ROM), a random access memory (RAM), a magnetic disk, or a compact disc-read only memory (CD-ROM).

Finally, it should be noted that the above embodiments are merely used to illustrate the technical solutions of the present application rather than limiting the technical solutions of the present application. Under the concept of the present application, the technical features of the above embodiments or other different embodiments may be combined, the steps therein may be performed in any sequence, and various variations may be derived in different aspects of the present application, which are not detailed herein for brevity of description. Although the present application is described in detail with reference to the above embodiments, persons of ordinary skill in the art should understand that they may still make modifications to the technical solutions described in the above embodiments, or make equivalent replacements to some of the technical features; however, such modifications or replacements do not cause the essence of the corresponding technical solutions to depart from the spirit and scope of the technical solutions of the embodiments of the present application.

What is claimed is:

1. A method for generating training data, comprising:
according to indexes of the object models, defining a corresponding category tag for an object model in a three-dimensional scenario, wherein each category tag represents the category of the object model;
acquiring a plurality of corresponding scenario images by modifying scenario parameters of the three-dimensional scenario, wherein the scenario parameters are some factors affecting the appearance performance of the three-dimensional model, and the scenario images are planar images of the three-dimensional scenario that are acquired under the effect of different factors, and wherein the scenario images corresponds to the scenario parameters;
rendering the object model to a monochromic material corresponding to the category tag of the object model;
acquiring a semantic segmentation image corresponding to each scenario image based on the rendered object model; and
storing each scenario image and the semantic segmentation image corresponding to the scenario image as a set of training data;
wherein the rendering the object model to the monochromic material corresponding to the category tag of the object model comprises:
judging whether a transparent object model achieves a shielding effect against the object model thereafter;
when the transparent object model achieves the shielding effect, assigning a category tag for the transparent object model and rendering the transparent object model to the corresponding monochromic material; and
when the transparent object model fails to achieve the shielding effect, maintaining the transparent object model as transparent in the semantic segmentation image or deleting the transparent object model from the semantic segmentation image.

2. The method according to claim 1, wherein the acquiring the plurality of scenario images corresponding to the three-dimensional scenario comprises:
dynamically adjusting illumination conditions of the three-dimensional scenario; and
capturing scenario images under different illumination conditions by a virtual camera.

3. The method according to claim 1, wherein the acquiring the plurality of corresponding scenario images by modifying the scenario parameters of the three-dimensional scenario comprises:
defining a photographing trajectory of the virtual camera; and
capturing scenario images from different view angles when the virtual camera moves along the photographing trajectory.

4. The method according to claim 1, wherein the acquiring the semantic segmentation image corresponding to each scenario image based on the rendered object model comprises:
acquiring the semantic segmentation image corresponding to each scenario image based on the rendered object model when illumination of the three-dimensional scenario is turned off.

5. The method according to claim 1, wherein the rendering the object model to the monochromic material corresponding to the category tag of the object model comprises:
determining a depth sequence of the object model in the scenario image; and
rendering in sequence the object model to the monochromic material corresponding to the category tag of the object model.

6. An image semantic segmentation method, comprising:
according to indexes of the object models, defining a corresponding category tag for an object model in a three-dimensional scenario, wherein each category tag represents the category of the object model;
acquiring a plurality of corresponding scenario images by modifying scenario parameters of the three-dimensional scenario, wherein the scenario parameters are some factors affecting the appearance performance of the three-dimensional model, and the scenario images are planar images of the three-dimensional scenario that are acquired under the effect of different factors, and wherein the scenario images corresponds to the scenario parameters;
rendering the object model to a monochromic material corresponding to the category tag of the object model;
acquiring a semantic segmentation image corresponding to each scenario image based on the rendered object model; and
storing each scenario image and the semantic segmentation image corresponding to the scenario image as a set of training data;
using the scenario image and the corresponding semantic segmentation image as training data;
wherein the rendering the object model to the monochromic material corresponding to the category tag of the object model comprises:
judging whether a transparent object model achieves a shielding effect against the object model thereafter;
when the transparent object model achieves the shielding effect, assigning a category tag for the transparent object model and rendering the transparent object model to the corresponding monochromic material; and
when the transparent object model fails to achieve the shielding effect, maintaining the transparent object model as transparent in the semantic segmentation image or deleting the transparent object model from the semantic segmentation image.

7. The image semantic segmentation method according to claim 6, wherein the acquiring the plurality of scenario images corresponding to the three-dimensional scenario comprises:
dynamically adjusting illumination conditions of the three-dimensional scenario; and
capturing scenario images under different illumination conditions by a virtual camera.

8. The image semantic segmentation method according to claim 6, wherein the acquiring the plurality of corresponding scenario images by modifying the scenario parameters of the three-dimensional scenario comprises:
defining a photographing trajectory of the virtual camera; and
capturing scenario images from different view angles when the virtual camera moves along the photographing trajectory.

9. The image semantic segmentation method according to claim 6, wherein the acquiring the semantic segmentation image corresponding to each scenario image based on the rendered object model comprises:

acquiring the semantic segmentation image corresponding to each scenario image based on the rendered object model when illumination of the three-dimensional scenario is turned off.

10. The image semantic segmentation method according to claim 9, wherein the rendering the object model to the monochromic material corresponding to the category tag of the object model comprises:
   determining a depth sequence of the object model in the scenario image; and
   rendering in sequence the object model to the monochromic material corresponding to the category tag of the object model.

11. An electronic device, comprising:
   at least one processor; and
   a memory communicably connected to the at least one processor; wherein
   the memory stores an instruction program executable by the at least one processor, wherein, the instruction program, when being executed by the at least one processor, cause the at least one processor to perform a method comprising:
   according to indexes of the object models, defining a corresponding category tag for an object model in a three-dimensional scenario, wherein each category tag represents the category of the object model;
   acquiring a plurality of corresponding scenario images by modifying scenario parameters of the three-dimensional scenario, wherein the scenario parameters are some factors affecting the appearance performance of the three-dimensional model, and the scenario images are planar images of the three-dimensional scenario that are acquired under the effect of different factors, and wherein the scenario images corresponds to the scenario parameters;
   rendering the object model to a monochromic material corresponding to the category tag of the object model;
   acquiring a semantic segmentation image corresponding to each scenario image based on the rendered object model; and
   storing each scenario image and the semantic segmentation image corresponding to the scenario image as a set of training data;
   wherein the rendering the object model to the monochromic material corresponding to the category tag of the object model comprises:
   judging whether a transparent object model achieves a shielding effect against the object model thereafter;
   when the transparent object model achieves the shielding effect, assigning a category tag for the transparent object model and rendering the transparent object model to the corresponding monochromic material; and
   when the transparent object model fails to achieve the shielding effect, maintaining the transparent object model as transparent in the semantic segmentation image or deleting the transparent object model from the semantic segmentation image.

12. The electronic device according to claim 11,
   wherein the acquiring the plurality of scenario images corresponding to the three-dimensional scenario comprises:
   dynamically adjusting illumination conditions of the three-dimensional scenario; and
   capturing scenario images under different illumination conditions by a virtual camera.

13. The electronic device according to claim 11,
   wherein the acquiring the plurality of corresponding scenario images by modifying the scenario parameters of the three-dimensional scenario comprises:
   defining a photographing trajectory of the virtual camera; and
   capturing scenario images from different view angles when the virtual camera moves along the photographing trajectory.

14. The electronic device according to claim 11,
   wherein the acquiring the semantic segmentation image corresponding to each scenario image based on the rendered object model comprises:
   acquiring the semantic segmentation image corresponding to each scenario image based on the rendered object model when illumination of the three-dimensional scenario is turned off.

15. The electronic device according to claim 11,
   wherein the rendering the object model to the monochromic material corresponding to the category tag of the object model comprises:
   determining a depth sequence of the object model in the scenario image; and
   rendering in sequence the object model to the monochromic material corresponding to the category tag of the object model.

* * * * *